US005741101A

United States Patent [19]
Gulistan

[11] Patent Number: 5,741,101
[45] Date of Patent: Apr. 21, 1998

[54] RELIABLE SNAP ACTION LOCKING FASTENER

[76] Inventor: Bullent Gulistan, 20568 Pinnacle Way, Malibu, Calif. 90265

[21] Appl. No.: 698,844

[22] Filed: Aug. 16, 1996

[51] Int. Cl.$^6$ ...................................................... F16B 39/22
[52] U.S. Cl. ........................................... 411/107; 411/353
[58] Field of Search ..................................... 411/107, 109, 411/147, 508, 509, 510, 352, 353, 913, 533

[56] References Cited

U.S. PATENT DOCUMENTS

| | | | |
|---|---|---|---|
| 2,877,818 | 3/1959 | Johnson | 411/107 |
| 3,503,431 | 3/1970 | Villa | 411/353 |
| 3,782,437 | 1/1974 | Seckerson | 411/107 |
| 4,324,517 | 4/1982 | Dey | 411/353 |
| 4,815,908 | 3/1989 | Duran | 411/353 |
| 5,413,441 | 5/1995 | Heminger | 411/107 |
| 5,590,900 | 1/1997 | Duran | 411/353 |

*Primary Examiner*—Steven N. Meyers
*Assistant Examiner*—Gary Estremsky
*Attorney, Agent, or Firm*—Oppenheimer Poms Smith

[57] ABSTRACT

A fastener for attaching a first object to the outside of a second object having a hole and a normally inaccessible inner surface. The fastener generally comprises a head portion, a resilient washer disposed in a stepped or double recess in the head portion, and a fastening section connected to the head portion. The resilient washer has a maximum diameter that is substantially larger than the hole, and a contoured or tapered outer surface adapted to engage, be compressed in, and slide through the hole in only one direction. When the fastener is pressed through the hole and the head portion emerges on the other side, the resilient washer springs back to its decompressed size and securely retains the fastener in the second object. Additionally, the washer has a flange that helps retain the washer in the head portion and acts to evenly distribute on the washer any forces exerted to remove a fully inserted fastener. When removal forces are exerted on the fastener, the flange prevents the washer from twisting, being deformed, and popping out of the head portion.

20 Claims, 1 Drawing Sheet

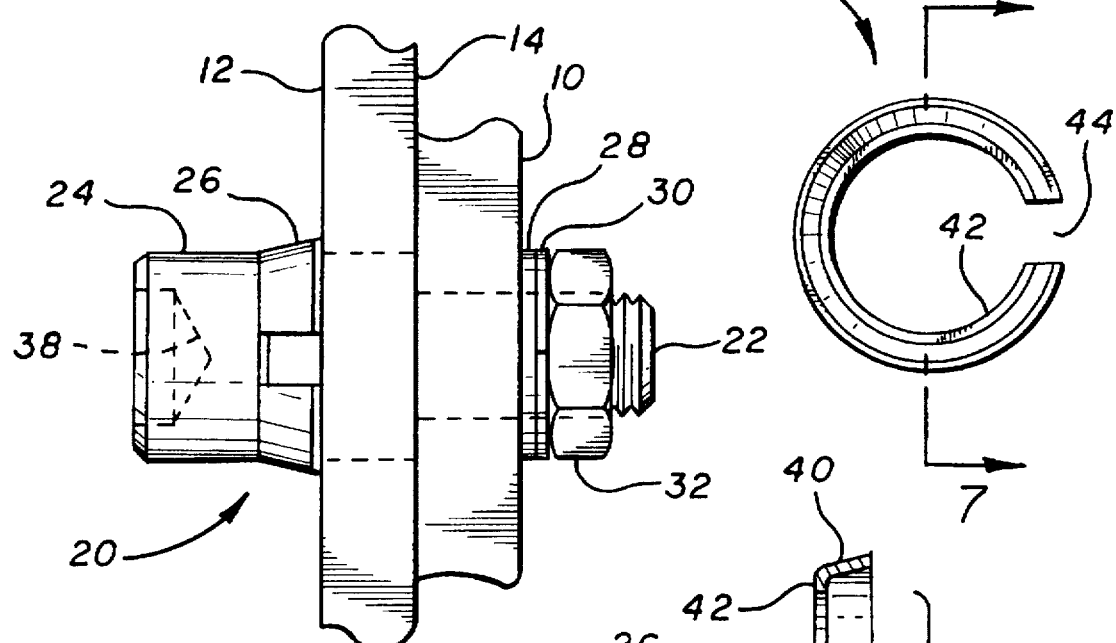
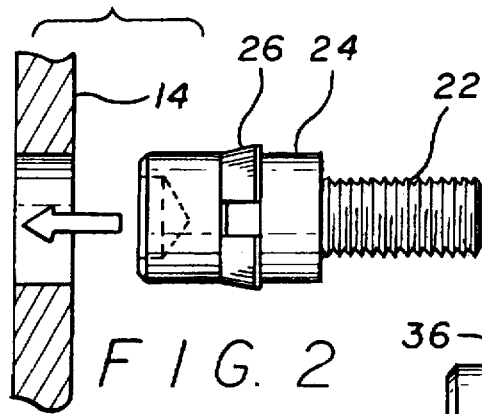
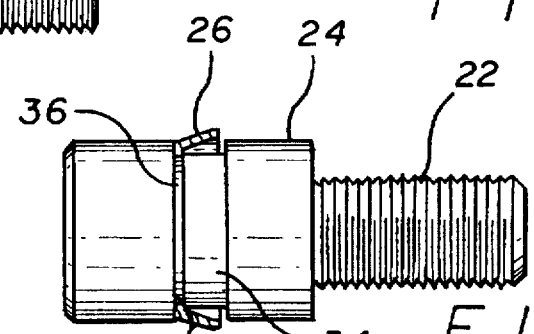
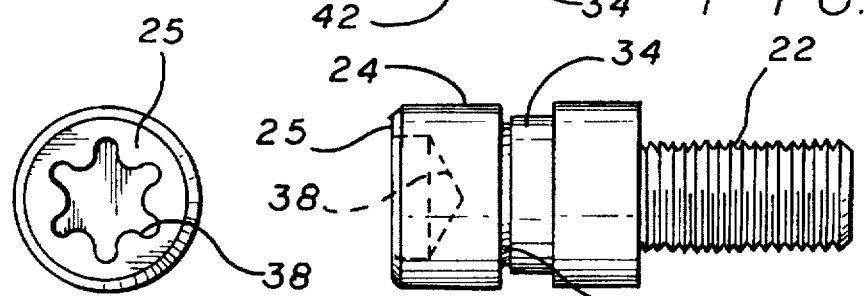
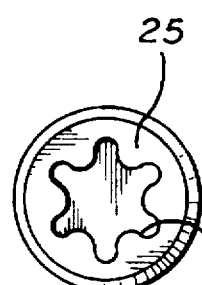

RELIABLE SNAP ACTION LOCKING FASTENER

BACKGROUND OF THE INVENTION

1. Field of the Invention

The present invention is directed to fasteners for securing objects to a panel having a normally inaccessible inner surface.

2. Description of Related Art

Various fasteners in the prior art attempt to achieve this general goal. However, many of these fasteners consist of two or more separate pieces, as in the case of toggle bolts and screw anchors. These additional pieces result in increased fabrication expense and assembly time, and are often bulky. Additionally, many prior art fasteners require modification of the object to be attached and/or the panel beyond drilling or providing a simple hole in the panel or the object.

One known fastener is substantially in the form of a bolt with an elongated head. A tapered, oversized symmetrical resilient ring is disposed in a recess in the head. One problem with this fastener is that it is subject to being pulled out of the panel because the ring has a symmetrical contour, and thus may be forced back through the hole by application of a force equal and opposite to the force required to insert the fastener. Further, the ring is subject to being twisted, deformed and popped out of the recess because there is no reliable mechanism to ensure that removal forces are evenly applied to the ring.

SUMMARY OF THE INVENTION

Accordingly, one object of the invention is to provide a reliable fastener which overcomes the foregoing shortcomings of prior art fasteners.

This invention involves a novel fastener that satisfies the above needs. Specifically, the present invention is directed to a fastener for attaching a first object to the outside of a second object having a hole through it and a normally inaccessible inner surface. The fastener generally comprises a head portion, a resilient washer, and a fastening section. The fastening section, which is connected to the head portion, is used to fasten the head portion to the first object (that is, the object to be attached). Among other arrangements, this fastening section can be comprised of a threaded section and a nut.

The head portion has a maximum transverse dimension that is slightly smaller than the hole in the second object. By contrast, the resilient washer, which is disposed in a recess in the head portion, has a maximum diameter that is substantially larger than the hole. Additionally, the washer has a contoured outer surface adapted to engage, be compressed in, and slide through the hole in one direction only. Thus, when the fastener is pressed through the hole and the head portion emerges on the other side, the resilient washer springs back to its decompressed size and securely retains the fastener in the second object.

In one version of the present invention, the contoured outer surface of the washer is in the form of a bevel. Additionally, the washer has a gap to facilitate compression of the washer, and an inwardly directed flange that helps retain the washer in the head portion. The head portion comprises a cylindrical portion, a first annular recess of smaller diameter in which the washer is seated, and a second annular recess of even smaller diameter within the first annular recess. The washer flange engages the second recess of the head portion.

The flange keeps the washer substantially concentric with the cylindrical portion and prevents the washer from being substantially displaced to one side of the first recess. The configuration of the flange is such that all points along the circumference of the maximum diameter of the washer project beyond the circumference of the cylindrical portion when the washer is not compressed, regardless of any minor displacement of the washer from a position concentric with the cylindrical portion. This ensures that forces exerted to remove the fastener will be evenly applied to the washer.

In a preferred embodiment of the invention, the outer surface of the washer is tapered with its larger or largest diameter being toward the threaded end of the fastener, and its smaller diameter toward the other end of the fastener.

Once the fastener is installed in a panel or other object, if a removal force is exerted on the fastener, the flange on the washer minimizes twisting and deformation of the washer and helps to prevent the washer from popping out of the cylindrical portion as the larger diameter portion of the washer bears against the inner surface of the panel or other object. Thus, the flange acts to securely retain the washer in the cylindrical portion when removal forces are exerted, and increases the strength, effectiveness and reliability of the fastener.

These and other features, aspects, and advantages of the present invention will become better understood with regard to the following description, appended claims, and accompanying drawings.

BRIEF DESCRIPTION OF THE DRAWINGS

FIG. 1 shows a side view of a completely assembled, preferred embodiment of a fastener illustrating the principles of the present invention as it is used to attach an object to a panel;

FIG. 2 shows an elevational view of a preferred embodiment of the fastener of the present invention located adjacent a panel having an aperture;

FIG. 3 is a partial cross-sectional view of the fastener of FIG. 2;

FIG. 4 is a side view of the fastener of FIG. 2 without the washer;

FIG. 5 is a front view of the head of the fastener of FIG. 2;

FIG. 6 is a plan view of the washer of the fastener of FIG. 2;

FIG. 7 is a sectional view of the washer of FIG. 6.

DETAILED DESCRIPTION OF THE PREFERRED EMBODIMENTS

The present invention is directed to a fastener for attaching a first object to the outside of a panel or other part having a normally inaccessible inner surface.

As shown in FIG. 1, an object 10 can be attached to the normally inaccessible inner surface 12 of a panel 14 by a preferred embodiment 20 of a fastener illustrating the principles of the present invention. Referring to FIGS. 1 through 5, fastener 20 generally comprises a threaded portion 22, a cylindrical portion 24 and a resilient washer 26.

The first step in attaching an object 10 to the panel 14 is inserting the fastener 20 through a hole in the object 10 that is of slightly larger diameter than the diameter of the threaded portion 22. An optional flat washer 28 and lock washer 30 may then be placed on the threaded portion 22. A nut 32 is then placed and tightened on the threaded portion 22. To prevent slippage, a fastening tool (not shown) may be inserted into a recess 38, which is shaped to receive the fastening tool, while the nut 32 is tightened.

Next, the cylindrical portion 24 is pressed through a hole in the panel 14 of slightly larger diameter than the diameter of the cylindrical portion 24. While the cylindrical portion 24 is pressed through the hole in the panel 14, a resilient washer 26 engaged in the recesses 34, 36 in the cylindrical portion 24 is compressed to a maximum diameter that is about equal to the diameter of the cylindrical portion 24 so that it can slide through the hole in panel 14.

After the cylindrical portion 24 is pressed through the hole in the panel 14, the resilient washer springs back to its decompressed, normal size. When decompressed, the maximum diameter of the washer 26 is substantially larger than the diameter of the cylindrical portion 24 and the hole in the panel 14, thereby securely retaining the object 10 to the panel 14.

As shown in FIG. 2 (elevational view) and FIG. 3 (partial cross-sectional view), a preferred embodiment of the fastener illustrating the present invention generally comprises a threaded portion 22, a cylindrical portion 24, and a washer 26. The length, diameter and thread size of the threaded portion 22 are selected according to the thickness and weight of the object or material to be attached, space limitations, and other design criteria known to those skilled in the art. The threaded portion 22 is integral with the cylindrical portion 24, and may be fabricated from various well-known metals and plastics. Type 1018 carbon steel or equivalent mild steel is suitable for this purpose. Although a thread and nut fastening arrangement is depicted in FIG. 1–3, other fastening means such as a rivet, snap, or clip arrangement may be used.

Although the cylindrical portion 24 is shown as a uniform cylinder, different shapes may be used. For example, instead of a cylindrical form, a polygonal form such as a hexagonal or octagonal form adapted to fit various wrenches may be used. Additionally, even if a cylindrical form is used, it need not be uniform. For example, longitudinal grooves along the cylinder may be included to allow easier grasping of the fastener, and varying diameters may be used to accommodate space limitations or hole diameter variations.

As best shown in FIG. 4, which is a side or elevational view of the fastener without the washer 26, the cylindrical portion 24 may include a first annular recess 34 and a second annular recess 36. The diameter of the first recess 34 is chosen to allow the washer 26 to be seated within the first recess 34. As best shown in FIG. 3, which is a sectional view of the fastener, the diameter of the second recess 36 is chosen to accommodate a flange portion 42 of the washer 26.

The cylindrical portion 24 further comprises an end portion 25. As shown in FIG. 5, which is a front elevational view, the end portion 25 includes a recess 38. The recess 38 may be of various shapes adapted to receive a fastening tool of torx type (FIG. 5 shows a six-lobed recess suitable for size T30 torx), or an Allen wrench, hex key, screwdrivers of Philips or slotted types, or other fastening tools.

The washer 26 is formed from a resilient material, such as various well-known metals and plastics. A stainless steel such as 17–7 PH, spring tempered and heat treated to a minimum hardness of Rc 38 (Rockwell Hardness, c scale), is suitable for this purpose. If this material is used, the maximum force required to install the fastener in a panel should be about thirty pounds, and the washer 26 should be able to withstand a minimum of about twenty-five insertion and removal cycles. The washer 26 is attached to the cylindrical portion 24 by rapidly snapping it into place, preferably by machine or use of a suitable fixture.

As shown in FIG. 6 (top plan view) and FIG. 7 (sectional view), the washer 26 has a contoured or tapered outer surface 40 with a diameter that varies between a minimum and maximum value. Although the contoured outer surface 40 shown in FIG. 6 and FIG. 7 is beveled or tapered, the contour can instead be curved. The shape of the contoured outer surface 40 is chosen to allow the resilient washer 26 to engage and then slide through the hole in the panel as the fastener is pressed through the hole, thereby compressing the resilient washer 26. The contoured outer surface 40 is also chosen so that the fastener can be pressed through the panel in only one direction; this prevents the fastener from being pulled out of the panel. A gap 44 in the washer 26 is chosen of sufficient size to allow the washer 26 to be compressed to a diameter about equal to the diameter of the cylindrical portion 24.

The maximum diameter of the washer 26 is chosen to be substantially larger than the diameter of the cylindrical portion 24 and the hole in the panel. When the fastener is pressed completely through the hole in the panel, the resilient washer 26 springs back to its normal, decompressed size, thereby retaining the fastener in the panel. The larger diameter face of the resilient washer is located toward the threads 22, to lock the fastener in place once it is pressed through the hole in part 14 as shown in FIG. 1.

The washer 26 further comprises a flange portion 42. The flange 42 engages the second inner recess 36 of the cylindrical portion 24, thereby securely retaining the washer 26 in the cylindrical portion 24. The flange 42 keeps the washer 26 substantially concentric with the cylindrical portion 24 and prevents the washer 26 from being tilted, or substantially displaced to one side of the first recess 34. The size of the flange 42 is preferably chosen to allow all points along the circumference of the maximum diameter of the washer 26 to project beyond the circumference of the cylindrical portion 24 when the washer 26 is not compressed, regardless of any minor displacement of the washer 26 from a position concentric with the cylindrical portion 24. This ensures that forces exerted to remove the fastener will be evenly applied to the washer 26.

Once the fastener is installed in a panel, if a removal force is exerted on the fastener, the flange 42 exerts an opposing force against the cylindrical portion 24. This opposing force minimizes twisting and deformation of the washer 26 and helps to prevent the washer 26 from popping out of the cylindrical portion 24. Thus, the flange 42 acts to securely retain the washer 26 in the cylindrical portion 24 when removal forces are exerted.

Concerning dimensions, the fastener of the present invention could be made in a number of sizes, with the part being dimensioned to suit or match the diameter and hole length of the holes in the panel 14 and object 10, and the mechanical forces which are involved. However, in one specific case the fastener was just under an inch in length, the diameter of the head portion was between 0.391 inch and 0.393 inch, the recess 34 was between 0.095 and 0.100 inch wide, and the recess 36 was between 0.020 and 0.025 inches wide. The diameter of the recess 34 was approximately 0.340 inch and that of recess 36 was between 0.288 and 0.293 inch. The lock washer 26 has a maximum outer diameter of between 0.430 and 0.435 inch, an inner diameter of between 0.318 and 0.323 inch and a taper on its outer surface of about 15°, with a gap of about one tenth of an inch. The thickness of the washer is about 0.090 inch.

It is understood that the foregoing detailed description and the accompanying drawings relate to the preferred embodiment of the invention. Various changes and modifications may be made without departing from the spirit and scope of the invention. Thus by way of example and not of limitation, the dimensions of the fastener may be modified to suit the size of the parts to be secured together and the mechanical strength requirements. By way of example, but not of limitation, the part 10 of FIG. 1 may be of flexible material such as an airbag, with a grommet or eyelet extending through the material. Instead of the flange on the washer being at the smaller diameter end of the washer, it could be at the larger end of the washer, but with sufficient diametrical clearances and/or gap in the washer to permit compression of the washer to pass through the hole in the panel 14 as shown in FIG. 1. In addition, the length of the various sections of the head of the fastener are sufficient to permit the washer to expand on the inner side of panel 14 following the passage of the washer through the hole in part 14. It is also noted that, instead of being integral with the rest of the fastener, the threaded end 22 could be a separate bolt or machine screw, with a head which is threaded into the main part of the fastener to hold the part 10 to the fastener. Accordingly, the present invention is not limited to the precise fastener construction as is shown in the drawings and described in the detailed description.

What is claimed is:

1. A fastener for attaching an object to the outside of a panel having a normally inaccessible inner surface, comprising:

a threaded portion;

a cylindrical portion having a first diameter, wherein said cylindrical portion includes a first annular recess having a second diameter, and a second annular recess within said first annular recess having a diameter smaller than said second diameter;

a resilient washer engaged in said first annular recess;

said washer having a contoured outer surface with a smaller diameter that is slightly smaller than said first diameter and a larger diameter that is substantially larger than said first diameter;

said washer also having an inwardly extending flange that engages said second annular recess to keep said washer substantially concentric with said cylindrical portion and prevent said washer from being substantially displaced to one side of said first annular recess;

said washer also having a gap sufficient to allow said washer to be compressed to a diameter equal to or less than said first diameter; and said washer being a single unitary part;

whereby said fastener can be pressed through a panel having a hole slightly larger than said first diameter and retained in said panel by said washer, which springs back to its decompressed shape after passing through said hole.

2. A fastener as defined in claim 1, wherein said cylindrical portion further includes an end portion opposite said threaded portion, wherein said end portion has a recess shaped to receive a fastening tool.

3. A fastener as defined in claim 1 wherein the larger diameter of said washer is located at the side of the washer toward said threaded portion of said fastener.

4. A fastener as defined in claim 1, further comprising a nut to engage said threaded portion of said fastener.

5. A fastener as defined in claim 4, further comprising a flat washer and a lock washer disposed between said nut and the object to be attached.

6. A fastener as defined in claim 1, wherein said threaded portion and said cylindrical portion are unitarily formed.

7. A fastener for attaching a first object to the outside of a second object having a hole and a normally inaccessible inner surface, comprising:

a head portion having a maximum transverse dimension that is adapted to be slightly smaller than said hole;

said head portion having a cylindrical portion, including a first annular recess having a second diameter, and a second annular recess within said first annular recess, said second annular recess having a diameter smaller than said second diameter;

a resilient washer disposed in said first annular recess in said head portion, said washer having a maximum diameter that is substantially larger than said hole;

said washer having a contoured outer surface adapted to engage, be compressed in, and slide through said hole in one direction only;

said washer having an inwardly extending flange engaging said second annular recess to keep said washer substantially concentric with said cylindrical portion and prevent said washer from being substantially displaced to one side of said first annular recess; and said washer being a single unitary part;

whereby said fastener can be pressed through said hole, and said washer springs back to its decompressed size after passing through said hole, thereby retaining said fastener in said second object.

8. A fastener as defined in claim 7 wherein the larger diameter of said washer is located at the side of the washer toward said threaded portion of said fastener.

9. A fastener as defined in claim 7, wherein said contoured outer surface is in the form of a bevel, said washer also having a gap to allow said washer to be compressed as it is pressed through said hole.

10. A fastener as defined in claim 6, wherein said head portion further includes an end portion, wherein said end portion has a recess shaped to receive a fastening tool.

11. A fastener as defined in claim 6, also having fastening means for fastening said head portion to said second object, wherein said fastening means is connected to said head portion and comprises a threaded portion.

12. A fastener as defined in claim 11, further comprising a nut to engage said threaded portion of said fastener.

13. A fastener as defined in claim 12, further comprising a flat washer and a lock washer disposed between said nut and the first object.

14. An assembly, comprising:

a first object having a hole and a normally inaccessible inner surface;

a second object to be attached to said first object;

a fastener, comprising a head portion having a maximum transverse dimension that is slightly smaller than said hole;

a resilient washer disposed in a recess in said head portion, said washer having a maximum diameter that is substantially larger than said hole;

said washer having a contoured outer surface adapted to engage, be compressed in, and slide through said hole in only one direction;

said head portion including a cylindrical portion having a first diameter;

said cylindrical portion having a first annular recess having a second diameter wherein said washer is seated;

said cylindrical portion further having a second annular recess within said first annular recess, said second recess having a diameter smaller than said second diameter;

said washer having an inwardly extending flange engaging said second recess to keep said washer substantially concentric with said cylindrical portion and prevent said washer from being substantially displaced to one side of said first annular recess;

whereby said fastener can be pressed through said hole, and said washer springs back to its decompressed size after passing through said hole, thereby retaining said fastener in said first object.

15. An assembly as defined in claim 14, wherein said contoured outer surface is in the form of a bevel, said washer also having a gap to allow said washer to be compressed in said hole.

16. A fastener as defined in claim 11, wherein said threaded portion and said cylindrical portion are unitarily formed.

17. An assembly as defined in claim 14, wherein said head portion further includes an end portion, wherein said end portion has a recess shaped to receive a fastening tool.

18. An assembly as defined in claim 14, wherein the larger diameter of said washer is located at the side of the washer toward said threaded portion of said fastener.

19. An assembly as defined in claim 14 also having a fastening means for fastening said head portion to said second object, wherein said fastening means is connected to said head portion and, comprises a threaded portion, and said threaded portion and said cylindrical portion are unitarily formed.

20. An assembly as defined in claim 19, further comprising a nut to engage said threaded portion of said fastener.

* * * * *